(12) United States Patent
Grech et al.

(10) Patent No.: US 9,699,696 B2
(45) Date of Patent: Jul. 4, 2017

(54) SYSTEM AND METHOD FOR PROVIDING HANDOVER TO AN AMBIGUOUS SMALL CELL ACCESS POINT IN A NETWORK ENVIRONMENT

(71) Applicant: CISCO TECHNOLOGY, INC., San Jose, CA (US)

(72) Inventors: Sandro Grech, Bath (GB); Santosh Ramrao Patil, Bangalore (IN); Cristovao Correia Da Silva, London (GB); Mark Grayson, Maidenhead (GB); Anton Okmyanskiy, Vancouver (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 116 days.

(21) Appl. No.: 14/299,905

(22) Filed: Jun. 9, 2014

(65) Prior Publication Data

US 2015/0358871 A1  Dec. 10, 2015

(51) Int. Cl.
*H04W 36/00* (2009.01)
*H04W 36/04* (2009.01)

(52) U.S. Cl.
CPC ....... *H04W 36/04* (2013.01); *H04W 36/0061* (2013.01)

(58) Field of Classification Search
CPC ..... H04W 36/04; H04W 48/20; H04W 60/00; H04W 84/18; H04W 36/30; H04W 64/00; H04W 80/04
(Continued)

(56) References Cited

U.S. PATENT DOCUMENTS 6,161,014 A * 12/2000 Girardeau ............. H04W 36/30
370/331
8,295,837 B2   10/2012 Hamel et al.
(Continued)

FOREIGN PATENT DOCUMENTS

EP    2268079    12/2010
EP    2395790    12/2011
(Continued)

OTHER PUBLICATIONS

Heywood—WO 2009-006041 A1.pdf.*
(Continued)

*Primary Examiner* — Charles Appiah
*Assistant Examiner* — Alexander Yi
(74) *Attorney, Agent, or Firm* — Patent Capital Group

(57) ABSTRACT

An example method is provided in one example embodiment and includes receiving a request to relocate a user equipment (UE) from a source macro radio to an ambiguous small cell access point (AP), wherein the request includes a target cell identity (ID) encoded with a source macro cell identifier for the source macro radio and a target sub-carrier identifier for the ambiguous small cell AP; determining potential target small cell APs for relocation of the first UE using the using the first target cell ID, wherein each of the potential target small cell APs are within a coverage area of the source macro radio and operate using the target sub-carrier identifier; and preparing, for each of the potential target small cell APs, a common channel to receive relocation of the first UE. The first UE can relocate to a particular target small cell access point using the common channel.

20 Claims, 8 Drawing Sheets

(58) Field of Classification Search
USPC ... 455/444, 525, 517, 435.1, 41.2, 438, 436, 455/456.1; 370/331
See application file for complete search history.

(56) References Cited

U.S. PATENT DOCUMENTS

| | | | |
|---|---|---|---|
| 8,345,633 | B2 | 1/2013 | Bradley et al. |
| 2007/0280166 | A1* | 12/2007 | Jung .................. H04B 1/713 370/331 |
| 2007/0291770 | A1* | 12/2007 | Kitazoe .............. H04J 11/0093 370/395.52 |
| 2008/0025275 | A1* | 1/2008 | Cheng ................. H04W 48/20 370/338 |
| 2010/0040023 | A1* | 2/2010 | Gallagher ............ H04W 8/02 370/331 |
| 2010/0041405 | A1 | 2/2010 | Gallagher et al. |
| 2010/0093354 | A1* | 4/2010 | Agashe ............... H04W 36/04 455/436 |
| 2010/0234028 | A1 | 9/2010 | Narashima et al. |
| 2010/0323694 | A1* | 12/2010 | Altintas .............. H04B 1/005 455/434 |
| 2011/0151878 | A1* | 6/2011 | Xu ...................... H04W 48/10 455/444 |
| 2012/0122477 | A1 | 5/2012 | Sadek et al. |
| 2012/0164979 | A1 | 6/2012 | Bachmann |
| 2012/0238268 | A1* | 9/2012 | Radulescu ....... H04W 36/0061 455/435.1 |
| 2013/0196666 | A1* | 8/2013 | Zhang .............. H04W 36/0005 455/436 |
| 2014/0087735 | A1 | 3/2014 | Vikberg et al. |
| 2015/0358872 | A1 | 12/2015 | Grech |

FOREIGN PATENT DOCUMENTS

| | | |
|---|---|---|
| EP | 2958370 | 12/2015 |
| WO | 2009/006041 | 1/2009 |
| WO | 2013/144611 | 10/2013 |

OTHER PUBLICATIONS

U.S. Appl. No. 14/302,086, filed Jun. 11, 2014, entitled "System and Method for Providing Handover to an Ambiguous Small Cell Access Point in a Network Environment," Inventor: Sandro Grech et al.,.

"3GPP TS 25.468 V8.1.0 (Mar. 2009) Technical Specification: 3$^{rd}$ Generation Partnership Orject; Technical Specification Group Radio Access Network; UTRAN Iuh Interface RANAP User Adaption (RUA) signaling (Release 8);" 3$^{rd}$ Generation Partnership Project (3GPPP); Mar. 2009; 43 pages.

"ETSI TR-125-931-V9.0.1 (Apr. 2011) Technical Report: Universal Mobile Telecommunications System (UMTS); UTRAN Functions, Examples on Signalling Procedures (3GPP TR 25.931 Version 9.0.1 Release 9);" © European Telecommunications Standards Institute 2011. All Rights Reserved; Apr. 2011, 132 pages.

"ETSI TS-125-413-V8.8.0 (Jul. 2011) Technical Specification: Universal Mobile Telecommunications System (UMTS); UTRAN Lu Interface radio Access Network Application Part (RANAP) Signalling (3GPP TS 25.412 Version 8.8.0 Release 8);" © European Telecommunications Standards Institute 2011. All Rights Reserved; Jul. 2011, 390 pages.

"ETSI TS-125-467-V9.3.0 (Jun. 2010) Technical Specification: Universal Mobile Telecommunications System (UMTS); UTRAN Architecture for 3G Home Node B (HNG); Stage 2 (3GPP TS 25.467 Version 9.3.0 Release 9);" © European Telecommunications Standards Institute 2010. All Rights Reserved; Jun. 2010,36 pages.

"ETSI TS-125-469-V9.3.0 (Oct. 2010) Technical Specification: Universal Mobile Telecommunications System (UMTS); UTRAN Luh Interface Home Node B (HNB) Application Part (HNBAP) signalling (3GPP TS 25.467 Version 9.3.0 Release 9);" © European Telecommunications Standards Institute 2010. All Rights Reserved; Oct. 2010, 64 pages.

"Macro to Small Cell, Metro Cell Hand-In," Agenda Item 10.7, R3-112026, 3GPP TSG-RAN3 Meeting #73, Athens Greece, Aug. 22-26, 2011; 8 pages.

"TR-069: CPE WAN Management Protocol," Issue 1, Amendment 4, Issue Date: Jul. 2011, Protocol Version 1.3, Broadband Forum Technical Report, © The Broadband Forum. All rights reserved; 190 pages.

"TR-196: Femto Access Point Service Data Model," Issue 2; Issue Date: Nov. 2011, Broad Forum Technical Report, © The Broadband Forum. All rights reserved; 46 pages.

USPTO Jan. 7, 2016 Non-Final Office Action from U.S. Appl. No. 14/302,086.

EPO Nov. 23, 2015 Extended European Search Report and Written Opinion from European Application 15170899.7; 12 pages.

"Report for [e-mail 74#07]: TP on Macro to HNB— non CSG UE," Agenda Item 15.1.2; Source: Qualcomm Incorporated; 3GPP TSG RAN WG3 #75, R3-120204, Dresden Germany, Feb. 6-10, 2012.

USPTO Feb. 17, 2017 Non-Final Office Action from U.S. Appl. No. 14/302,086.

USPTO Jul. 29, 2016 Final Rejection from U.S. Appl. No. 14/302,086.

* cited by examiner

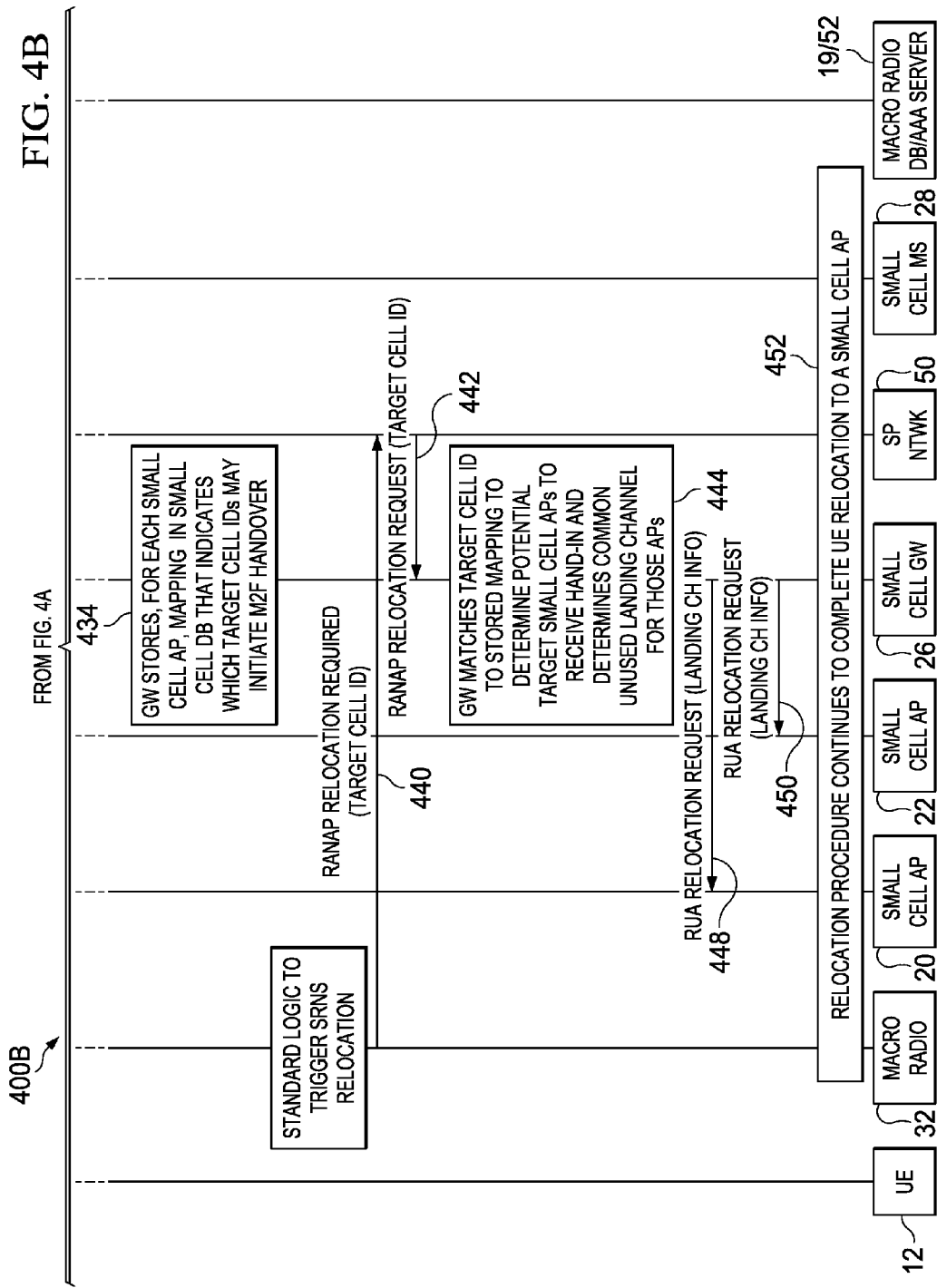

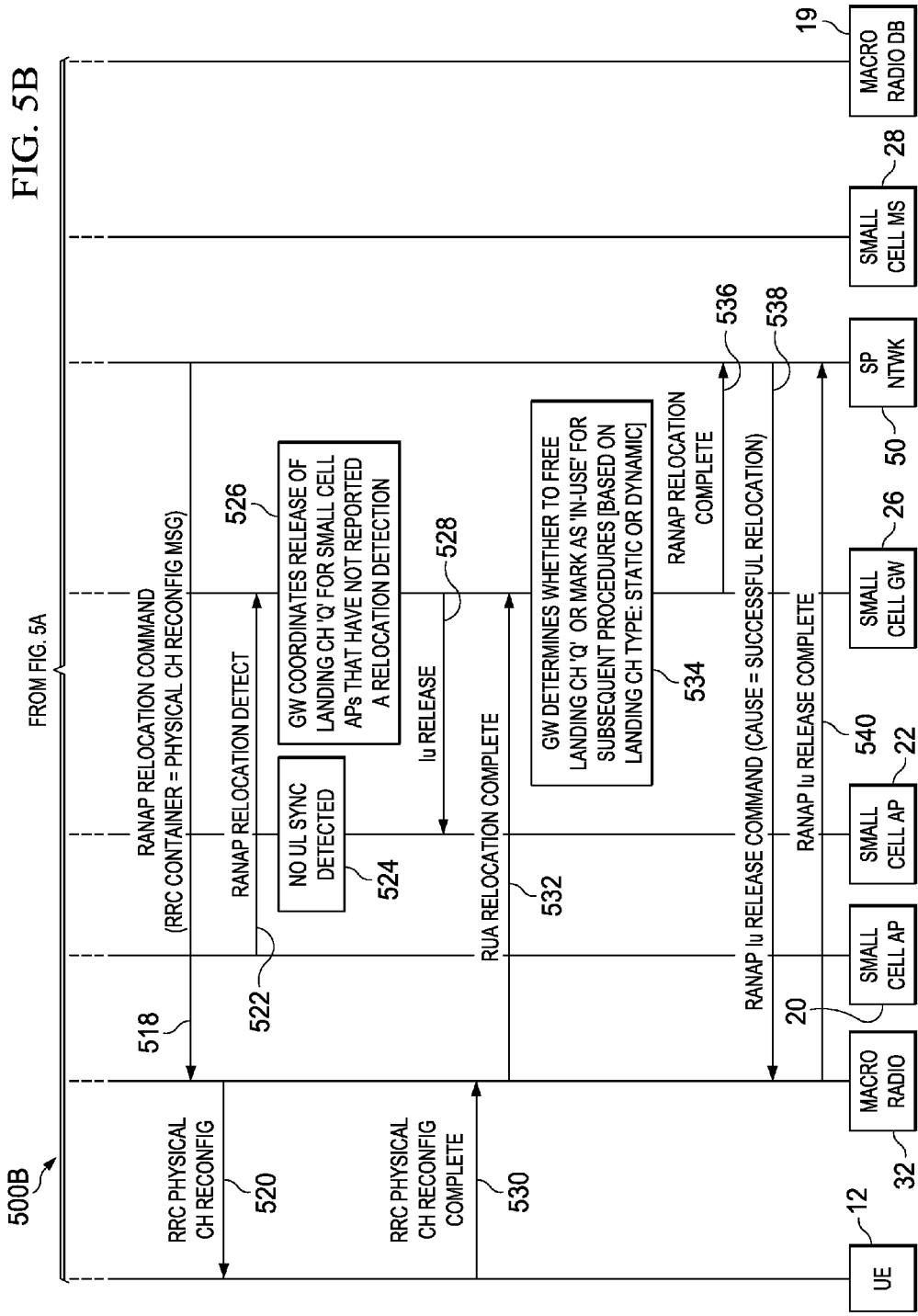

SYSTEM AND METHOD FOR PROVIDING HANDOVER TO AN AMBIGUOUS SMALL CELL ACCESS POINT IN A NETWORK ENVIRONMENT

TECHNICAL FIELD

This disclosure relates in general to the field of communications and, more particularly, to a system and method for providing handover to an ambiguous small cell access point in a network environment.

BACKGROUND

Networking architectures have grown increasingly complex in communication environments. For example, small cells have gained notoriety due to their capabilities to connect wireless devices to a network. In general terms, small cell access points can operate in a licensed spectrum to connect user equipment to the network, often using broadband connections. For a mobile operator, small cell access points can offer improvements to both coverage and capacity, which is particularly applicable to indoor networking environments where macro cell networks typically suffer coverage limitations. Small cell access points can also offer an alternative networking architecture to deliver the benefits of scalable small cell deployments. However, there are significant challenges in managing access to small cell access points, particularly in the context of determining and preparing small cell access points to receive handover of a subscriber from a macro network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 4A-4B are simplified flow diagrams illustrating other example flows and activities associated with providing handover to an ambiguous small cell access point in a network environment in accordance with one potential embodiment of the present disclosure; and FIGS. 5A-5B are simplified flow diagrams illustrating yet other example flows and activities associated with providing handover to an ambiguous small cell access point in a network environment in accordance with one potential embodiment of the present disclosure.

DETAILED DESCRIPTION OF EXAMPLE EMBODIMENTS

Overview

Figure 1:
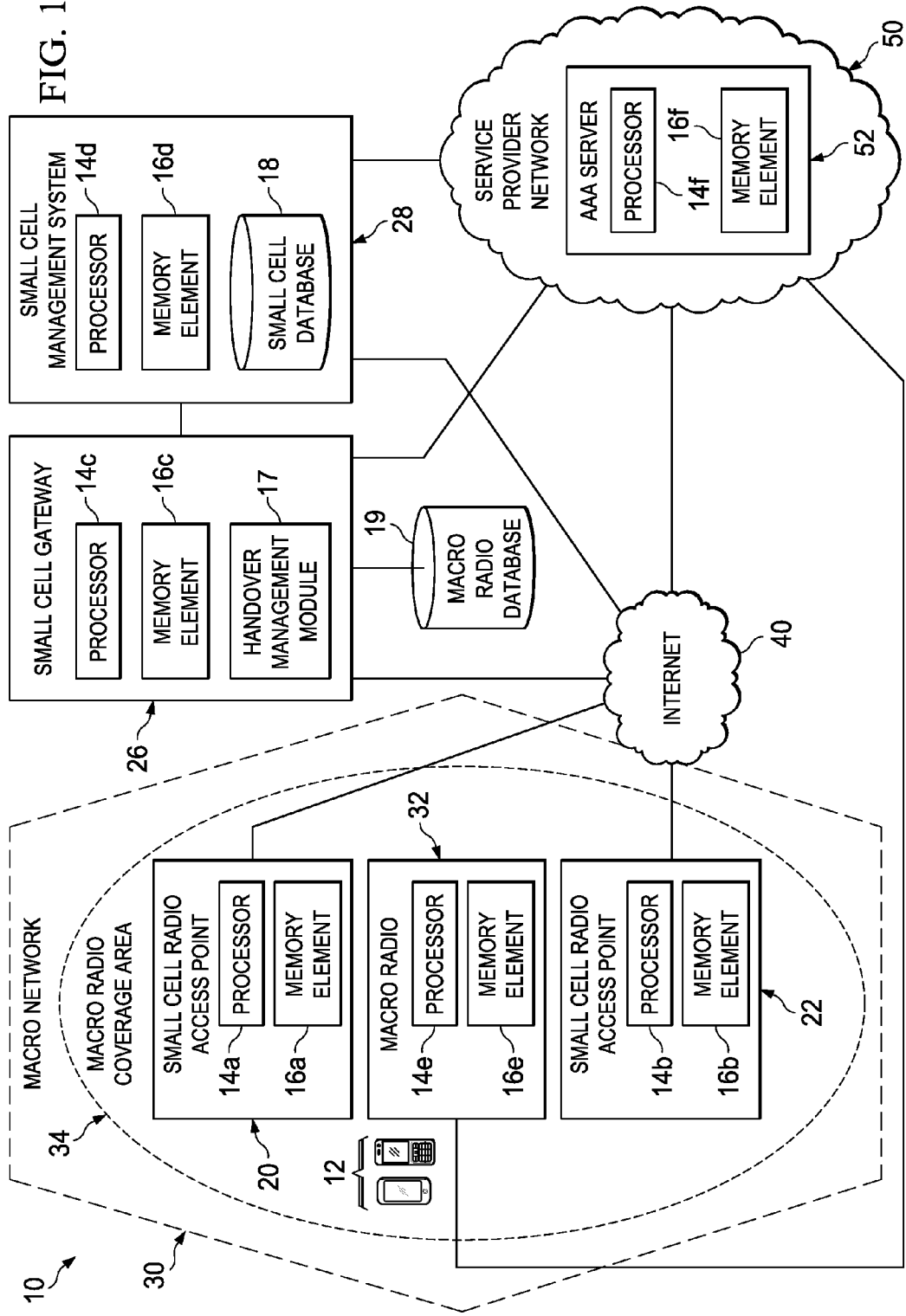
FIG. 1 is a simplified block diagram illustrating a communication system to facilitate providing handover to an ambiguous small cell access point in a network environment according to one embodiment of the present disclosure.

A method for a communication network is provided in one example embodiment and may include receiving a request to relocate a first user equipment (UE) from a source macro radio to an ambiguous small cell access point, wherein the request includes, at least in part, a first target cell identity (ID) encoded, at least in part, with a source macro cell identifier for the source macro radio and a target sub-carrier identifier for the ambiguous small cell access point; determining a plurality of potential target small cell access points for relocation of the first UE using the using the first target cell ID, wherein each of the plurality of potential target small cell access points are within a coverage area of the source macro radio and operate using the target sub-carrier identifier; and preparing, for each of the plurality of potential target small cell access points, a common channel to receive relocation of the first UE, wherein the first UE attempts to relocate to a particular target small cell access point using the common channel prepared for the plurality of potential target small cell access points.

In some cases the method can include storing, in at least one memory element, a geolocation of each of a plurality of macro radios, wherein the geolocation of each macro radio is stored in relation to a corresponding target cell ID for each macro radio; and storing a geolocation and a sub-carrier identifier for each of a plurality of small cell access points. In some instances, the determining the plurality of potential target small cell access points further include recovering a geolocation for the source macro radio using the first target cell ID; recovering the target sub-carrier identifier for the ambiguous small cell access point using the target cell ID; and filtering, from the plurality of small cell access points, the plurality of potential target small cell access points that are located within a predetermined range from the geolocation of the macro radio and that operate using the target sub-carrier identifier.

In another instance, the method can include determining a macro neighbor list for each of a plurality of small cell access points. Each macro neighbor list for each of a particular small cell access point can include one or more macro cell identifiers indicating one or more macro radios that provide a coverage area that overlaps, at least in part, a coverage area for the particular small cell access point; and a corresponding sub-carrier identifier used by the particular small cell access point. In some cases, the method can further include encoding, in at least one memory element, one or more second target cell IDs for each macro neighbor list, wherein each second target cell ID information element for each of a particular neighbor list is encoded, at least in part, with a macro cell identifier for a corresponding macro radio identified in a macro neighbor list for the particular small cell access point a corresponding sub-carrier identifier for the particular small cell access point.

In another instance, the method can include determining close range macro radios for each of a plurality of small cell access points by recovering reports of Radio Environment Measurements (REMs) performed by each of the plurality of small cell access points, wherein each REM report for each of a particular small cell access point includes one or more macro cell identifiers indicating one or more corresponding macro radios that provide a coverage area that overlaps, at least in part, a coverage area for the particular small cell access point and a corresponding sub-carrier identifier used by the particular small cell access point.

In some instances, the determining the plurality of potential target small cell access points can further include receiving, by a small cell gateway, the first target cell ID; and querying the one or more second target cell IDs using the first target cell ID to filter, from the plurality of small cell access points, the potential target small cell access points within the coverage area for the source macro radio that operate using the target sub-carrier identifier.

In some cases, the method can include releasing the common channel prepared for each of the plurality of potential target small cell access points to which the UE did not relocate. In yet other cases, the method can include configuring a plurality of channels for each of a plurality of small cell access points, wherein each channel can be used to receive handover for a particular UE; and maintaining a record of used and unused channels for each of the plurality of small cell access points, wherein the record is used to determine the common channel to prepare for each of the potential target small cell access points to receive relocation of the first UE.

Example Embodiments

Turning to FIG. 1, FIG. 1 is a simplified block diagram illustrating a communication system 10 to facilitate providing handover to an ambiguous small cell access point in a network environment according to one embodiment of the present disclosure. This particular configuration may be tied to the 3rd Generation Partnership Project (3GPP) Evolved Packet System (EPS) architecture, also sometimes referred to as the Long Term Evolution (LTE) EPS architecture. Alternatively, the depicted architecture may be applicable to other environments equally.

The example architecture of FIG. 1 may include user equipment (UE) 12, small cell radio access points (APs) 20, 22, a small cell gateway (GW) 26, a small cell management system (MS) 28, a macro radio 32, an internet 40, a service provider network 50 including an Authentication, Authorization and Accounting (AAA) server 52, and a macro radio database 19. As referred to herein in this Specification, a 'small cell radio AP' may also be referred to interchangeably as a 'small cell', 'small cell AP', 'femtocell' or 'femto'. Small cell APs 20, 22, small cell GW 26, small cell MS 28, macro radio 32 and AAA server 52 may each include a respective processor 14a-14f and a respective memory element 16a-16f. Small cell GW 26 may include a handover management module 17 and small cell MS 28 may include a small cell database 18. Macro radio 32 may broadcast a macro radio coverage area 34.

In various instances, macro network 30 may include macro radio access networks (RANs) such as GSM EDGE radio access network (GERAN), UMTS terrestrial radio access network (UTRAN), generally referred to as 3G, and/or LTE access networks such as evolved UTRAN (E-UTRAN), generally referred to as 4G or LTE. Macro radio 32 may provide a cellular/mobile macro cell 34, shown as a broadcast coverage area, within macro network 30. Service provider network 50 may be configured with one or more logical connections to macro radio 32.

In one or more embodiments, macro radio 32 may be a Node B (NB), which may be in communication with a radio network controller (RNC), which may provide 3G cellular/mobile coverage for one or more UE within macro network 30. In one or more embodiments a NB and an RNC may be deployed in separate network elements or a same network element. In one or more embodiments, macro radio 32 may be an eNode B (eNB), which may provide 4G/LTE cellular/mobile coverage for one or more UE 12 within macro network 30. Although only one macro radio 32 is illustrated in FIG. 1, it should be understood that macro network 30 can include multiple macro radios to provide 3G and/or 4G/LTE cellular/mobile coverage for the network. As referred to herein in the present specification the term 'macro network' may be used interchangeably with 'macro cell network' and 'macro cell RAN.'

Small cell APs 20, 22, small cell GW 25, and small cell MS 28 may make up a small cell RAN or small cell network, as may be referred to herein in this Specification. Although only two small cell APs 20, 22 are illustrated in FIG. 1, it should be understood that the small cell network can include multiple small cell APs to provide cellular/mobile coverage for one or more UE 12 to the small cell network. In various instances, the small cell network may include access networks such as GERAN, UTRAN (3G), and/or E-UTRAN (4G/LTE).

Small cell APs 20, 22 may be configured to interface with small cell GW 26, small cell MS 28 and service provider network 50 via internet 40 using one or more interfaces, protocols, or other communication mechanisms, wired or wireless, as may be appropriate for a given implementation of communication system 10. Small cell GW 26 may further be configured to interface with small cell MS 28, service provider network 50, AAA server 52 and macro radio database 60 using one or more interfaces, protocols or other communication mechanisms, wired or wireless, as may be appropriate for a given implementation of communication system 10. Small cell MS 28 may further be configured to interface with service provider network 50, AAA server 52 and macro radio database 60 using one or more interfaces, protocols or other communication mechanisms, wired or wireless, as may be appropriate for a given implementation of communication system 10.

In one or more embodiments, any of small cell APs 20, 22 may be implemented as a Home Node B (HNB), small cell GW 26 may be implemented as an HNB gateway (HNB-GW) and small cell MS 28 may be implemented as an HNB management system (HMS) all of which may be used to provide to provide 3G cellular/mobile coverage for one or more UE 12 to the small cell network using any appropriate protocol or technique. In one or more embodiments, any of small cell APs 20, 22 may be implemented as a Home eNode B (HeNB), small cell GW 26 may be implemented as an HeNB gateway (HeNB-GW) and small cell MS 28 may be implemented as an HeNB management system all of which may be used to provide to provide 4G/LTE cellular/mobile coverage for one or more UE 12 to the small cell network using any appropriate protocol or technique. In one or more embodiments, any of small cell APs 20, 22, small cell GW 26 and small cell MS 28 may be implemented as 'dual stack' devices including components to provide cellular/mobile coverage for 3G and 4G/LTE access networks for the small cell network. In other embodiments, these devices may be implemented as 'triple stack' devices to provide wireless coverage for Wi-Fi, Bluetooth™ and/or WiMAX wireless communications. Small cell APs 20, 22 can be provisioned using the small cell MS 28 according to according to technical report 069 (TR-069) protocol using the TR-196 data model.

Service provider network 50 may include other elements, gateways, etc. that may make up an Evolved Packet Core (EPC) for the network. For example, these elements may include, but not be limited to, Mobility Management Entity (MME), a Home Subscriber Server/Home Location Register (HSS/HLR), one or more serving gateways (SGWs), one or more packet data network gateways (PGWs), one or more serving gateway support nodes (SGSNs) and/or a policy and charging rules function (PCRF). These elements may be provided in service provider network 50 to provide various UE services and/or functions, to implement QoS on packet flows and to provide connectivity for UEs to external data packet networks. These elements are not shown in service provider network 50 in order to highlight other features of communication system 10.

Before detailing some of the operational aspects of FIG. 1, it is important to understand common characteristics of small cell access points (APs) (e.g., HeNBs, HNBs, or more generally, femotcells, picocells, etc.) as they generally operate in commercial architectures. The following foundation is offered earnestly for teaching purposes only and, therefore should not be construed in any way to limit the broad teachings of the present disclosure. In many network architectures, small cell APs can be deployed as autonomous units to improve reception in areas with poor coverage, or within buildings where coverage is reduced by the structure itself.

Essentially, small cell APs are fully featured base stations that can provide proximate coverage in a business (e.g., enterprise) and/or residential environment. Typically, small cell APs operate at lower radio power levels as compared to macro cell radio access networks (RANs). Small cell APs can be connected using a standard broadband digital subscriber line (DSL), internet or cable service into a service provider's network. Calls can be made and received, where the signals are sent (potentially encrypted) from the small cell AP via the broadband IP network to one of the service provider's main switching centers. Small cell APs can be provisioned to readily handle 8, 16, 32, etc. concurrent calls. Thus, a small cell AP (e.g., HeNB, HNB, etc.) generally operates as a mini tower for a proximate user. As used herein in this Specification, the terms 'user' and 'subscriber' may be used interchangeably.

In operation, when in range of a small cell AP (e.g., in an enclosed environment such as a building, etc.), a given UE can automatically detect the small cell AP using various measurement operations to detect signal quality of neighboring cells. The UE can provide measurement reports including carrier information for neighboring cells to a serving macro cell radio (e.g., NB/RNC, eNB). Based on the reports, the serving macro cell radio may determine to initiate a hand-in/out operation by sending a dummy or pseudo sub-carrier identifier (ID) and an International Mobile Subscriber Identity (IMSI) of a given user associated with the UE together with a source macro cell identifier to a small cell GW via a service provider's network and the small cell GW can try to determine which small cell AP to select for the hand-in. The source macro cell identifier and sub-carrier identifier may be embedded in a target cell identity (ID) information element or container, which is discussed in further detail below. Note the pseudo sub-carrier ID is merely a generic identifier, which the macro cell radio uses to identify a group of small cells, which may be able to receive hand-in of the UE based on their respective carrier configurations (which have been previously reported by the UE to the macro cell radio).

Note this is a 'hand-in' operation from the neighboring small cell's perspective and a 'hand-out' from the serving macro cell radio perspective. More generally, this can be referred to as a handover (HO) between the macro cell radio and a small cell AP. As referred to herein in this Specification, the terms 'hand-in' and 'handover' may be used interchangeably. Using the pseudo cell ID, the small cell GW can try to determine an appropriate small cell AP for handover of the UE. For 3G networks, carrier information for small cell APs can include an UMTS terrestrial radio access (UTRA) absolute radio frequency channel number (UARFCN) and primary scrambling code (PSC). For 4G networks, carrier information for small cell APs can include an evolved UTRA (E-UTRA) absolute radio frequency channel number (EARFCN) and physical cell identifier (PCI). As used to herein in this Specification, PSCs and PC's may be generally referred to as sub-carrier identifier (ID), which can be used to generically identify small cells being broadcast within a given carrier frequency (e.g., a respective UARFCN or EARFCN, depending on access network type).

To receive handover of the UE, the small cell GW can include a capability to fan-out handover requests to a plurality of candidate target small cells when a handover request is received for an ambiguous target small cell (e.g., identified merely by a carrier frequency and a sub-carrier ID, such as PSC or PCI). In a given macro cell network there are often many small cell APs sharing a sub-carrier ID that is reused throughout the network. Thus, due to the reuse of PSC and/or PCI within the macro cell network, the handover request needs to be communicated to many small cell APs in the network. Supporting the fan-out of the handover message requires that all candidate small cells configure an identical physical channel to receive handover of the UE. As referred to herein in this Specification, physical channels that may be configured to receive handover for a given UE may be referred to as 'landing channels'.

Communicating the fan-out to all small cells in the macro network that have a same sub-carrier ID as identified in the handover request can be burdensome on network devices and, generally, may be an inefficient use of network resources. To avoid sub-optimal usage of landing channels, and/or increased handover failures due to lack of available landing channels, a pool of landing channels should be defined, managed and coordinated across the system. One solution to these problems has been proposed by 3GPP by having UEs decode system information (SI) from neighbors, but such requires UE and macro cell radios (e.g., NB/RNC, eNB) to be upgraded to Release 9 (R9) of 3GPP standards, which can exclude application of the solution to current and/or legacy devices that will not be upgraded to R9.

In accordance with one embodiment, communication system 10 can overcome the aforementioned shortcomings (and others) through activities that provide for the management and coordination of the physical channel configuration for landing channels as well as through activities that provide for efficient mechanisms to determine a pool of potential target small cell APs, which can receive handover of a given UE 12 using geolocation information, neighbor information for macro cells and small cell APs and/or Radio Environment Measurements (REMs) performed by small cell APs within the system. Thus, the solutions described herein can be used to realize optimized macro-to-HNB/HeNB mobility.

For example, communication system 10 may provide for the definition of two logically separate RF databases. In one embodiment, a first database, macro radio database 19, can be configured with a plurality of target cell ID information elements (IEs). As referred to herein in this Specification, a target cell ID IE may also be referred to generally as a 'target cell ID container' or 'target cell ID'. In one embodiment, each target cell ID stored in macro radio database 19 may be associated with or mapped to the geolocation of a given macro radio (e.g., macro radio 32) broadcasting a neighbor macro cell coverage area (e.g., macro radio coverage area 34) within macro network 30. In another embodiment, for each of one or more macro radios in macro network 30, a macro radio identifier may be associated with or mapped to a geolocation for a corresponding macro radio and stored in macro radio database 19.

A particular target cell ID may be received in a relocation request triggered for hand-in of a given UE 12. The relocation request may be communicated to small cell GW 26 from service provider network 50. The particular target cell ID received in the relocation request, as well as the target cell IDs stored in macro radio database 19 may each be encoded with a macro cell ID that may identify a source macro radio broadcasting a neighbor macro cell through which the hand-in was triggered (e.g., macro radio 32 broadcasting macro radio coverage area 34) and may also be encoded with a sub-carrier ID, which may identify a PSC or PCI of an ambiguous target small cell AP, which can receive relocation of UE 12 within the coverage area of the macro radio (e.g., one or both of small cell APs 20, 22).

Using the particular target cell ID included in the relocation request received by small cell GW 26, one or more first enhanced function(s), co-located in small cell GW 26 via handover management module 17, may be operable to recover the target cell ID from the relocation request and may further be defined to query macro radio database 19 to recover the geolocation of source macro radio 32 and to recover the target sub-carrier ID for one or both of small cell APs 20, 22. For example, the sub-carrier ID could match that for both small cell APs 20, 22 if both are configured to operate using the target sub-carrier ID. In various embodiments, the geolocation of source macro radio 32 may be recovered using the target cell ID, the source macro cell ID contained in the target cell ID, and/or any other association of a source macro cell identifier to geolocation information for source macro radio 32.

Note a target sub-carrier ID does not particularly identify an ambiguous target small cell AP, rather a target sub-carrier ID may be associated to a pseudo sub-carrier ID included in a measurement report received from UE 12 for an ambiguous small cell AP in in the vicinity of UE 12. Macro radio 32 may encode the target cell ID with a sub-carrier ID associated with a pseudo cell ID included in a measurement report upon initiating hand-in of UE 12. Thus, the target sub-carrier ID may identify a PSC or PCI for one of potentially many ambiguous target small cell APs that can receive relocation of UE 12.

A second database, small cell database 18, can be configured with the geolocation of the small cell APs stored together with their corresponding operational sub-carrier IDs (e.g., PSCs or PCIs). Using the geolocation of macro radio 32 and the target sub-carrier ID recovered using the target cell ID, the one or more first enhanced functions may be operable to query small cell database 18 with the geolocation of source macro radio 32 and the target sub-carrier ID to determine a pool of potential target small cell APs operating at the sub-carrier ID and that may be located within a specified search range of the source of source macro radio 32 that can receive hand-in of UE 12. For example, the pool could include one or both of small cell APs 20, 22 depending whether each may operate at the target sub-carrier ID and may be located within the given range of source macro radio 32.

Thus, the architecture of communication system 10 may be operable to perform multi-level filtering of small cell APs within a small cell network. By filtering out small cell APs that are not configured with a sub-carrier ID matching the target sub-carrier ID the system can determine a first set of potential target small cell APs. This first set can then be filtered into a second set of potential target small cell APs that are located within a given range from the source macro cell geolocation. In one or more embodiments, small cell database 18 and macro radio database 19 may be co-located in a single network element (e.g., co-located within small cell MS 28) or may be located in separate network elements. In one or more embodiments, macro radio database 19 could also be located in AAA server 52. In one or more embodiments, small cell database 18 can also be located in small cell GW 26. In one or more embodiments, the query to small cell database 18 can optionally include a search range, which may indicate a distance or perimeter from the source macro radio 32 in which to search for potential target small cell APs to receive hand-in of UE 12.

The system may further include one or more second enhanced function(s) that may also be contained within handover management module 17, which may be operable to identify a common landing channel amongst the plurality of potential target small cell AP identities that can receive hand-in of UE 12 and to prepare the common landing channel for each identified small cell AP to receive hand-in of UE 12. The second function(s) may maintain a record of landing channels currently reserved for hand-ins on a per small cell AP basis. Upon determining the pool of potential target small cell APs using the first function, the second function may use this information together with the list of available landing channels from a pool of available landing channels, possibly on a per-small cell AP basis, to identify a common landing channel amongst the pool of potential target small cell APs to receive hand-in of UE 12. Having identified a common landing channel, say, for example, channel '5', a relocation request message (e.g., a radio access network application part (RANAP) relocation request message encapsulated in a RANAP user adaption (RUA) relocation request message) can be unicast by small cell GW 26 to the identified potential target small cell APs (e.g., one or both of small cell APs 20, 22) indicating preparation of channel '5' to receive hand-in of UE 12. In turn, each potential target small cell AP may reconfigure channel '5' in order to receive hand-in of UE 12.

UE 12 may attempt to relocate to one of the potential target small cell APs using the common landing channel prepared for the small cell APs. Hand-in of UE 12 may be received on the common landing channel for one of the potential target small cell APs. Small cell GW 26 may detect which of the potential target small cell APs may receive hand-in of UE 12 and, based on the detection, may communicate a release of the unused landing channel to those potential target small cell APs that did not receive hand-in of UE 12. As noted, small cell GW 26 may track the use of available landing channels to receive hand-in of various UE. Thus, upon receiving an indication from the small cell AP receiving hand-in of UE 12 that the relocation has completed (e.g., RUA relocation complete message), small cell GW 26 may internally free the common landing channel, e.g., channel '5' for the present example, for use in subsequent hand-in procedures of other UE. Note that until the relocation message may be received, channel '5' in the present example may be marked as 'in-use' within small cell GW 26 and may not be added back to the pool of available landing channels to receive hand-in of a UE. In one or more embodiments, a landing channel may be a temporary channel that may be configured for a given small cell AP 20, 22 to receive hand-in of a given UE 12, in which case UE 12 may be moved to a permanent channel after relocation is completed for the UE. In one or more embodiments, a landing channel may also be a permanent channel configured for a given small cell AP 20, 22 to both receive relocation of a given UE 12 and to provide resources to UE 12 after relocation is completed for the UE.

As discussed above, a target cell ID may be encoded with a macro cell ID that may identify a source macro radio broadcasting a neighbor macro cell through which a relocation for a given UE 12 may be triggered and may also be encoded with a target sub-carrier ID, which may identify a PSC or PCI of an ambiguous target small cell AP that can receive relocation of UE 12. Encoding target cell IDs can be provided for by macro radios (e.g., eNBs, NB/RNCs) within macro network 30.

The encoding of macro cell IDs within target cell ID IEs may vary depending on implementation and can be set based on coverage type (e.g., 3G, 4G/LTE) and/or as desired by a service provider. For example, a target cell ID IE may be 24-bits in length. For 3G deployments, a macro cell ID may be associated with a source NB broadcasting a source macro radio coverage area. In one or more embodiments, a macro cell ID for 3G RANs can be encoded to represent a full NB cell (e.g., radio) ID, typically, 16-bits; can be encoded to represent a compressed NB cell ID (e.g., less than 16-bits); or can be encoded to represent a compressed UTRAN cell ID (UCI), which typically includes a NB cell ID and a source/controlling RNC ID for the NB cell.

For 4G/LTE deployments a macro cell ID may be associated with an eNB broadcasting a source macro radio coverage area. In one or more embodiments, a macro cell ID can be encoded to represent a full eNB cell ID, typically 20-bits; can be encoded to represent a compressed eNB cell ID (e.g., less than 20-bits); or can be encoded to represent a compressed E-UTRAN cell ID, which typically includes an eNB cell ID and a PCI for a broadcast cell coverage area.

The encoding of target sub-carrier IDs within target cell ID IEs may also vary depending on implementation. Not only can target sub-carrier IDs be related to PSC for the 3G implementations or PCI for 4G/LTE implementations, but they may also be encoded as either full PSCs/PCIs or compressed PSCs/PCIs depending on a chosen method for encoding macro cell IDs within the target cell IDs. As discussed above, the length of encoded macro cell IDs can vary, and thus, the encoding of PSCs/PCIs may also vary according in various embodiments. Geolocation data for macro radios within macro network 30 can be stored and referenced in macro radio database The storage of macro radio geolocation data and/or sub-carrier ID data within macro radio database 19 may also vary based on what information may be included in a target cell ID. Say, for example, for a 3G RAN that target cell IDs may be encoded with a macro cell ID representing a NB cell ID and a full target PSC for an ambiguous target small cell AP. Further, assume that a source/controlling RNC ID can also be recovered for a handover request message. Thus, in this instance, macro radio geolocation data may be stored in macro radio database 19 in relation to a given macro cell ID for a given source macro radio (e.g., a NB cell ID), which can be recovered from a given target cell ID included in a relocation request, and a source/control RNC ID for the given NB cell ID. Further, since a full target PSC can be included in the target cell ID, then the target PSC can be reused and forwarded to a small cell GW with the geolocation data for the source macro radio.

However, say, for example for a 4G/LTE RAN that target cell IDs may be encoded with a macro cell ID representing a macro radio (e.g., a 20-bit length eNB cell ID) and a compressed target PCI for an ambiguous target small cell AP. Recall, a target cell ID IE may be 24-bits in length. Thus, in this example, 4-bits may be used to encode a compressed target PCI in the target cell IDs. PC's are often identified using 8-bits. Thus, in a communication system where target cell IDs include compressed target PCIs, macro radio database 19 or some other database, look-up, or other dictionary system could be used, which could identify PC's used in the system on a regional or local level. A similar mechanism could be used if compressed target PSCs were encoded in target cell IDs or if compressed macro cell IDs (for either NB or eNB macro radios) were encoded in target cell IDs. These examples are just a few of the many encoding, storing, querying and/or look-up mechanisms that could be provided in communication system 10 for use of target cell IDs encoded with macro cell ID information and target PSC or PCI information. Virtually any other encoding, storing, querying and/or look-up mechanisms could be provided in communication system 10 for use with various databases that may incorporate target cell ID information, macro radio identifiers, macro radio geolocation information and/or small cell AP geolocation and sub-carrier information.

In one or more embodiments, small cell database 18 and macro radio database 19 can also be converged with AAA functionality provided by AAA server 52 such that when small cell GW 26 triggers an AAA procedure associated with a small cell AP registration, a list of target cell IDs (e.g., macro cells encoded in the target cell IDs) that are valid for triggering a handover to the small cell AP (e.g., one of small cell APs 20, 22) can be returned from AAA server 52, stored in the small cell GW 26 and used for determining the fan-out of macro-to-femto (M2F) handover target small cell candidates. In this manner, macro cell neighbor relationships may be determined and stored for small cell APs 20, 22. The neighbor relationships can be determined using various methods or techniques.

In one or more embodiments, the neighbor relationships can be discovered from small cell APs 20, 22 which can determine their macro cell neighbors through radio environment management (REM) scans to generate corresponding REM reports; can be configured by a service provider in small cell GW 26, small cell MS 28; or can be configured in some external database, which can be queried by small cell GW 26 and/or small cell MS 28. In various embodiments, a REM report for a corresponding small cell AP can include one or more macro cell identifiers indicating one or more corresponding macro radios in close range that may provide a coverage area that overlaps, at least in part, a coverage area for the particular small cell access point and a corresponding sub-carrier identifier used by the particular small cell AP.

In various embodiments, UE 12 can be associated with users, employees, clients, customers, etc. wishing to initiate a flow in communication system 10 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 10. UE 12 may also be inclusive of a suitable interface to a human user such as a microphone, a display, a keyboard, or other terminal equipment.

UE 12 may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12 may have a bundled subscription for network access and application services (e.g., voice), etc. Once the access session is established, the user can register for application services as well, without additional authentication requirements. There can be two different user data repositories (e.g., AAA databases, whitelist databases, etc.): one for the access user profile and one for the application user profile. IP addresses can be assigned using dynamic host configuration protocol (DHCP), Stateless Address Auto-configuration, default bearer activation, etc., or any suitable variation thereof.

Small cell AP 20, 22 can offer suitable connectivity to one or more UE 12 using any appropriate protocol or technique. In general terms, small cell AP 20, 22 represents a radio access point device that can allow UEs to connect to a wired network using Wi-Fi, Bluetooth™ WiMAX, 4G/LTE, or any other appropriate standard. Hence, the broad term 'radio access point' can be inclusive of a wireless access point (WAP), a femtocell, a hotspot, a picocell, a WiFi array, a wireless bridge (e.g., between networks sharing same Service Set Identifier (SSID) and radio channel), a wireless local area network (LAN), an HeNB, an HNB, or any other suitable access device, which may be capable of providing suitable connectivity to a UE. In certain cases, the access point can connect to a router (via a wired network), which can relay data between the UE and other UE of the network.

The EPC components of service provider network 50 may be referred to generally as control nodes, control gateways or simply gateways. The gateways may be used to provide various UE services and/or functions and to implement QoS on packet flows. The services and functions may be used, for example, to provision voice over IP (VoIP) routing, enhanced services such as enhanced charging, stateful firewalls and/or traffic performance optimization (TPO). An MME is the primary control element for the EPC, which among other things, may provide for UE tracking and paging procedures including, for example, retransmissions, tracking area list management, idle mode UE tracking, etc.

AAA server 52 is a network element responsible for accounting, authorization and authentication functions for UE 12. For AAA considerations, AAA server 52 may provide a mobile node IP address and the accounting session identification (Acct-Session-ID) and other mobile node states in appropriate messaging (e.g., via access-Request/ access-Response messages). Authentication refers to the process where an entity's identity is authenticated, typically by providing evidence that it holds a specific digital identity such as an identifier and the corresponding credentials. The authorization function determines whether a particular entity is authorized to perform a given activity, typically inherited from authentication when logging on to an application or service. Authorization may be determined based on a range of restrictions, for example time-of-day restrictions, or physical location restrictions, or restrictions against multiple accesses by the same entity or user. Accounting refers to the tracking of network resource consumption by users for the purpose of capacity and trend analysis, cost allocation, billing, etc. In addition, it may record events such as authentication and authorization failures, and include auditing functionality, which permits verifying the correctness of procedures carried out based on accounting data. In various embodiments, communication system 10 may be provisioned with other AAA services and/or AAA servers, which may provide AAA considerations for the system.

As shown in FIG. 1, small cell AP 20, 22, small cell GW 26, small cell MS 28, macro radio 32 and AAA server 52 include respective processors 14a-14f and respective memory elements 16a-16f. Additionally, small cell GW 26 further includes handover management module 17 and small cell MS includes small cell database 18. Macro radio database 19 is also provided in the system. Hence, appropriate software and/or hardware is being provisioned in small cell AP 20, 22, small cell GW 26, small cell MS 28, macro radio 32 and AAA server 52 in order to facilitate providing handover to an ambiguous small cell AP in the network environment. Note that in certain examples, certain databases (e.g., small cell database 18, macro radio database 19) can be consolidated with memory elements (or vice versa), or the storage can overlap/exist in any other suitable manner.

In one example implementation, small cell AP 20, 22, small cell GW 26, small cell MS 28, macro radio 32 and AAA server 52 are network elements, which are meant to encompass network appliances, servers, routers, switches, gateways, bridges, loadbalancers, firewalls, processors, modules, or any other suitable device, component, element, or object operable to exchange information that facilitates or otherwise helps coordinate subscriber identification activities (e.g., for networks such as those illustrated in FIG. 1). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 10, each of small cell AP 20, 22, small cell GW 26, small cell MS 28, macro radio 32 and AAA server 52 can include memory elements for storing information to be used in achieving the handover operations, as outlined herein. Additionally, each of these devices may include a processor that can execute software or an algorithm to perform the handover activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to small cell AP 20, 22, small cell GW 26, small cell MS 28, macro radio 32 and AAA server 52 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and user equipment (e.g., mobile nodes) can also include suitable interfaces for receiving, transmitting, and/or otherwise communicating data or information in a network environment.

Note that in certain example implementations, the handover functions as outlined herein may be implemented by logic encoded in one or more tangible media, which may be inclusive of non-transitory media (e.g., embedded logic provided in an ASIC, in DSP instructions, software [potentially inclusive of object code and source code] to be executed by a processor, or other similar machine, etc.). In some of these instances, memory elements [as shown in FIG. 1] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 2:
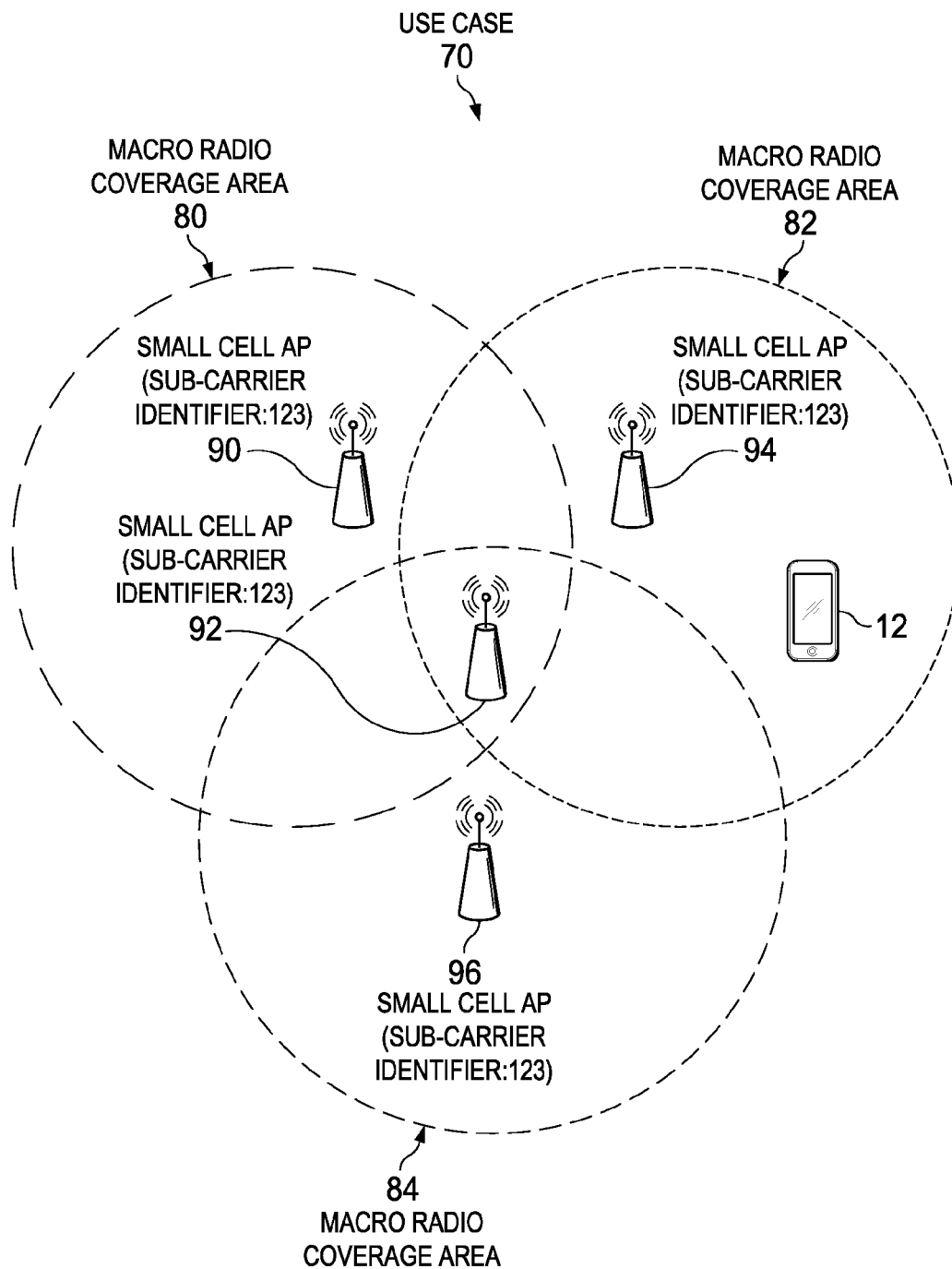
FIG. 2 is a simplified block diagram illustrating details associated with an example use case in a particular implementation of the communication system.

Turning to FIG. 2, FIG. 2 is a simplified block diagram illustrating details associated with an example use case 70 of communication system 10 for providing handover of a given UE 12 to an ambiguous small cell AP, wherein the system includes macro radio coverage areas 80, 82, 84 and small cell APs 90, 92, 94, 96. Each macro radio coverage area 80, 82, 84 may be broadcast by a corresponding macro radio (not shown), which may be assumed to be located at or near the center of each respective macro radio coverage area 80, 82, 84. Each small cell AP 90, 92, 94, 96, 98 may be configured with a sub-carrier ID='123' (e.g., a PSC or PCI, depending on 3G or 4G/LTE implementation, respectively). For FIG. 2, reference will be made to small cell GW 26, small cell database 18, macro radio database 19 and AAA server 52 from FIG. 1; however, these elements are not shown in FIG. 2 in order to illustrate other features of communication system 10.

As illustrated in FIG. 2, small cell APs within the system can be overlapped by multiple coverage areas. For example, small cell APs 90 and 92 may be overlapped by the coverage area 80; small cell APs 92 and 94 may be overlapped by coverage area 82; and small cell APs 92 and 96 and 98 may be overlapped by coverage area 84. Accordingly, small cell AP 92 may be overlapped by both coverage areas 80, 82 and 84. Thus, use case 70 illustrates various potential complexities for providing handover of a given UE in communication systems that can include multiple small cell APs sharing a same sub-carrier ID and being overlapped by multiple macro radio coverage areas.

As discussed above, a pair of databases can be configured for the system. For purposes of illustration only, assume for the present example that coverage areas 80, 82, 84 may provide 3G cellular/mobile coverage for the system. Further, assume that target cell IDs may be encoded to include a macro cell ID representing NB cell ID for each NB broadcasting each coverage area 80, 82 84 and that the target cell IDs may be encoded with full PSCs. Macro radio database 19) can be configured with geolocation information for each macro NB radio broadcasting each macro radio coverage area 80, 82, 84. Small cell database 18 can be configured with geolocation information for each of small cell APs (e.g., HNBs) 90, 92, 94 and 96 as well as sub-carrier IDs (e.g., PSCs) of '123' for each small cell AP. In the present example, assume a handover for UE 12 may be initiated including a target cell ID encoded with a source macro cell ID representing a source macro NB radio broadcasting coverage area 82 and a full target sub-carrier ID (e.g., PSC) of '123' for one of ambiguous target small cell APs 92 and 94. Small cell GW 26 (e.g., an HNB-GW) may receive the relocation request and may query macro radio database 19 using the received target cell ID.

Macro radio database 19 can be queried using the target cell ID to recover the geolocation of the source macro NB radio and the target PSC can be recovered from the target cell ID. The response to the query may include the geolocation data and target PSC. Small cell database can then be queried using the geolocation data and the target PSC to determine small cell APs in a specified range from the macro NB radio geolocation. Assume the query may return identifiers for small cell APs 92 and 94 as potential target small cell APs to receive hand-in of UE 12. Small cell GW 26 may then determine unused landing channels for small cell APs 92 and 94 to determine a common unused landing channel for small APs 92 and 94 to receive hand-in of UE 12. Upon determining the common landing channel, small cell GW 26 may unicast a RUE relocation request message to small cell APs indicating the identified common channel to receive hand-in of UE 12. Each potential target small cell AP 92 and 94 may reconfigure the identified common channel in order to receive hand-in of UE 12. Processing for the system may continue as described above to receive hand-in of UE 12 and free the common channels after relocation is completed.

In another example, assume macro neighbor list information may be stored in macro radio base 19 in place of, or in addition to macro radio geolocation information, or in another database altogether. In this example, macro neighbor relationships may be configured for each small cell AP 90, 92, 94, 96 (e.g., using REM scans, configured by an operator, by querying AAA server 52, etc.) and may be stored in relation to a macro cell ID indicating a dominant macro radio providing a macro radio coverage area overlapping a small cell AP. Note, the indication of a 'dominant' macro radio may be arbitrary in the system and may instead be used for organizing macro cell neighbor information in macro radio database 19.

For example, a macro cell ID representing a macro radio broadcasting macro radio coverage area 80 may be identified as a dominant macro cell for small cell AP 90, and a macro neighbor list for small cell AP 90 can include macro cell IDs representing macro radios broadcasting coverage areas 82 and 84. The macro neighbor list can be an encoded set of target cell IDs. For example, a first target cell ID could be encoded to include a macro cell ID representing a macro radio broadcasting macro radio coverage area 82 and a target sub-carrier ID representing the sub-carrier ID for small cell AP 90. A second target cell ID could be encoded to include a macro cell ID representing a macro radio broadcasting macro radio coverage area 84 and a target sub-carrier ID representing the sub-carrier ID for small cell AP 90. Additionally, assume, for example, that macro radios broadcasting coverage areas 82 and 84 may also be configured as neighbors for small cell AP 92; macro radios broadcasting coverage areas 80 and 84 may be configured as neighbors for small cell AP 94; and macro radios broadcasting coverage areas 80 and 82 may be configured as neighbors for small cell AP 90.

During operation, if, for example, a relocation request is received for UE 12 including a target cell ID encoded with a source macro cell ID representing the macro radio providing macro radio coverage area 82 and encoded with a sub-carrier ID matching that of small cell AP 94, then querying the neighbor list data with using the target cell ID may recover identities for potential target small cell APs to receive hand-in of UE 12 that may include small cell AP 92, 94 and 96 (e.g., small cell APs having a matching sub-carrier ID to small cell AP 94). Note the target sub-carrier ID does not identify target small cell AP 94, rather the sub-carrier ID for small cell AP 94 may be an ambiguous identifier associated with a pseudo sub-carrier ID included in a measurement report received from UE 12. Although small cell AP 96 may not be included in coverage area 82, because it is included in coverage area 84, which is a neighbor of coverage area 82, then it may be included as a potential target small cell AP to receive hand-in of UE 12. Using neighbor lists, thus, may help to alleviate missed potential target small cell APs for receiving hand-in of a given UE as opposed to relying on the coverage area for a particular source macro radio identified in a received target cell ID alone.

Figure 3A:
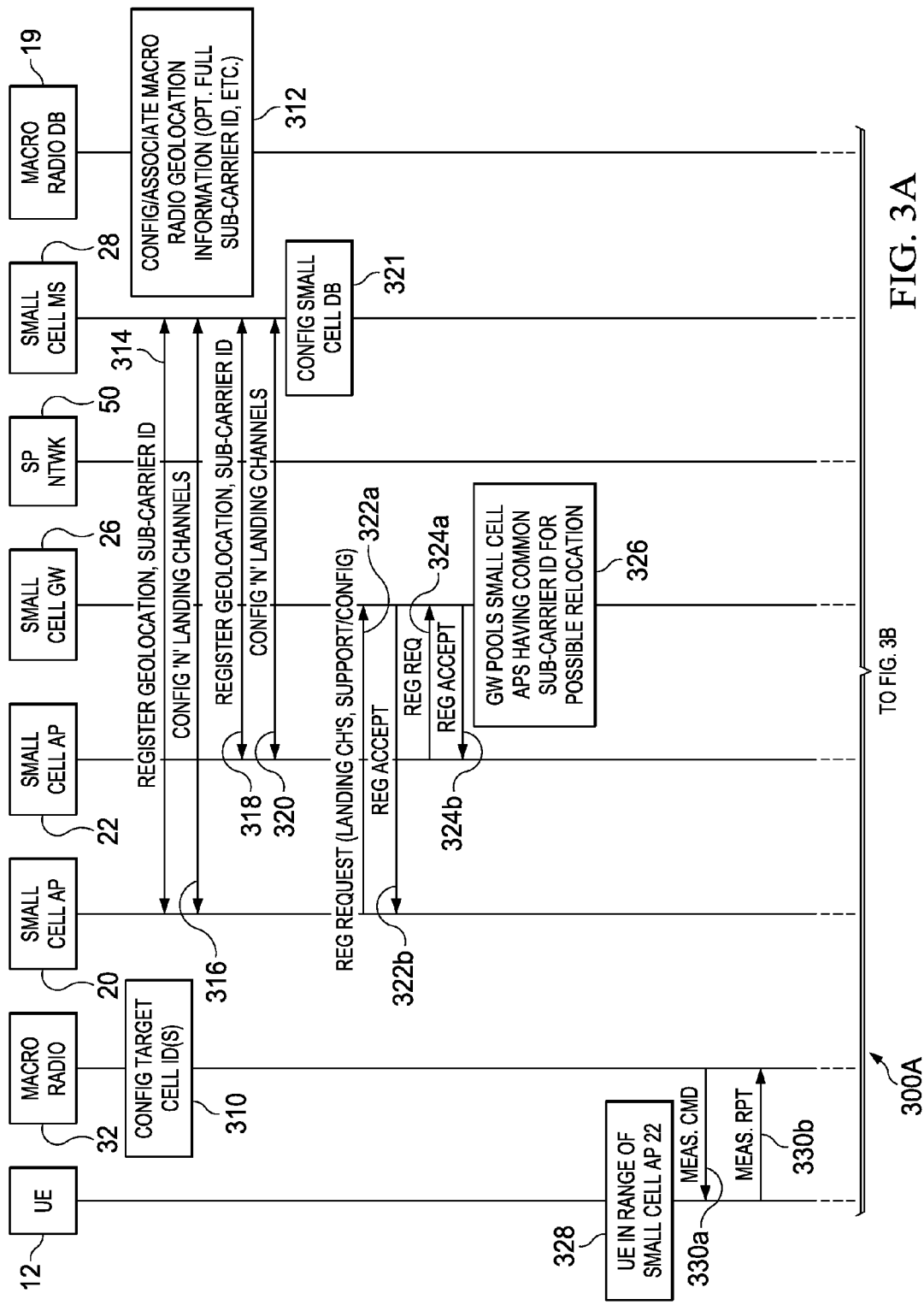
FIGS. 3A-3B are simplified flow diagrams illustrating example flows and activities associated with providing handover to an ambiguous small cell access point in a network environment in accordance with one potential embodiment of the present disclosure.
Figure 3B:
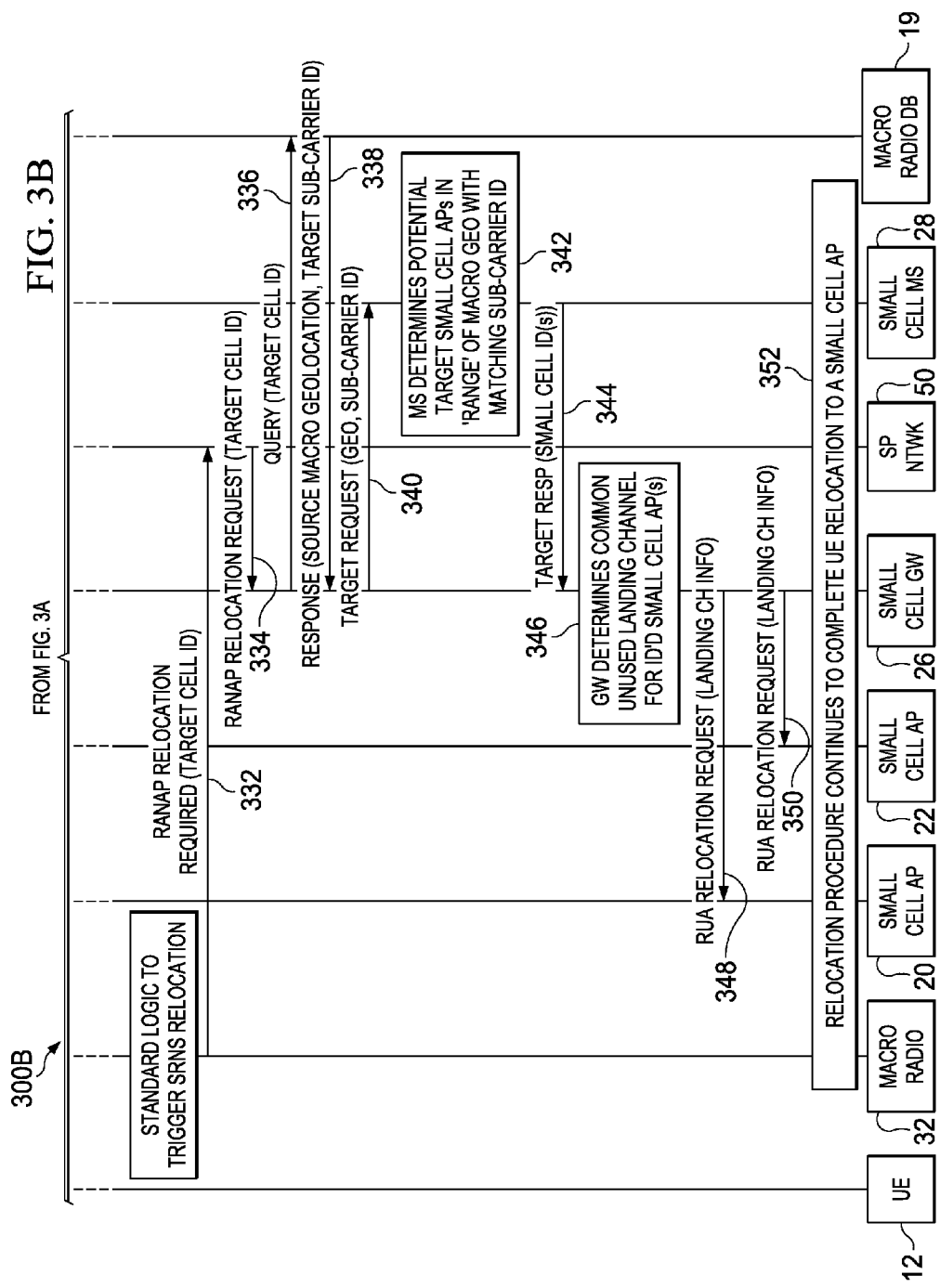

Referring to FIGS. 3A-3B, FIGS. 3A-3B are simplified flow diagrams 300A-300B, respectively, that illustrates example flows and activities associated with providing handover to an ambiguous small cell AP (e.g., one of small cell APs 20, 22) in a network environment according to an embodiment. In FIGS. 3A-3B, 4A-4B and 5A-5B the flows of data and activities represented show the flow of data between the components and activities performed by certain components within communication system 10 as shown in FIG. 1, such as, a given UE 12, macro radio 32 (e.g., an NB/RNC or eNB), small cell AP 20, 22, small cell GW 26 (including handover management module 17), service provider network (SP NTWK) 50, small cell MS 28 and macro radio database (DB) 19. Small cell database (DB) 18 may be assumed to be located within small cell MS 28.

In the example flow diagram 300A shown in FIG. 3A, at 310, macro radio 32 may be configured with one or more target cell IDs, each which may be encoded with a macro cell ID corresponding to the identity of macro radio 32 and a target sub-carrier ID corresponding to one or more target sub-carrier IDs for small cell APs 20, 22. For purposes of the present example, it is assumed that small cell APs 20, 22 may be configured with a same sub-carrier ID; thus, macro radio 32 may only need to configure one target cell ID for use within communication system 10. At 312, macro radio database 19 may be configured with one or more target cell IDs (here, only one target cell ID), which may be associated to the geolocation of macro radio 32. Optionally, macro radio database 19 may be configured with one or more look-up tables, if, for instance, a sub-carrier ID encoded in the target cell IDs may not represent a full target sub-carrier ID such that a look-up could be performed to determine a full target sub-carrier ID upon receiving a compressed sub-carrier ID. In another option, macro radio database 19 may be configured with a macro radio identifier and a corresponding geolocation of for macro radio 32. Other look-ups could be configured depending on other information (full or compressed), which may be encoded in target cell IDs. Additionally, source/controlling RNC information could be stored in macro database for use with 3G macro radios.

A particular flow may begin at 314, with a registration of the geolocation and sub-carrier ID of small cell AP 20 within small cell MS 28. One or more messages may be exchanged between small cell AP 20 and small cell MS 28 to register the information. At 316, 'N' landing channels may be configured for small cell AP 20 via small cell MS 28 for use in subsequent handover operations. One or more messages may be exchanged between small cell AP 20 and small cell MS 28 to configure the 'N' landing channels. At 318, the geolocation and sub-carrier ID of small cell AP 22 may be registered within small cell MS 28, similar to that described at flow 316 for small cell AP 20. At 320, 'N' landing channels may be configured for small cell AP 22 via small cell MS 28. At 321, small cell MS 28 may configure small cell database 18 with the information gathered from the registrations of small cell AP 20, 22.

Continuing at 322a, small cell AP 20 may communicate a small cell register request message to small cell GW 26. The register request may include information regarding the 'N' landing channels configured for small cell AP 20, as well as other support and/or configuration information for small cell AP 20. At 322b, small cell GW 26 may communicate a register accept to small cell AP 20. A similar register request/accept exchange may be communicated between small cell AP 22 and small cell GW 26 at 324a-324b. Upon registering small cell APs 20, 22, small cell GW 26 may pool together small cell APs having a common sub-carrier ID for use in possible relocations at 326. In the present example, both of small cell APs 20, 22 may be included in a same pool, however, it should be understood that small cell GW 26 may provide for storing/tracking multiple pools of small cell APs according to different sub-carrier IDs that may be provided for in communication system 10.

At 328, it is assumed for the present example that UE 12 is in range of a coverage area provided by small cell AP 22. At 330a, macro radio 32 may communicate a measurement command to UE 12 for a given pseudo sub-carrier ID, for example, a pseudo sub-carrier ID associated with the sub-carrier IDs for small cell APs 20, 22. At 330b, UE 12 may communicate a measurement report to macro radio 32 for the pseudo sub-carrier ID. The flows and activities from FIG. 3A may continue to flows and activities as shown in flow diagram 300B for FIG. 3B. Macro radio 32 may include standard logic to trigger a serving radio network subsystem (SRNS) relocation for UE 12 based on the measurement report. At 332, source macro radio 32 may communicate a RANAP relocation required message to service provider network 50 including the target cell ID previously encoded with the macro cell ID for source macro radio 32 and the target sub-carrier for small cell APs 20, 22. At 334, the RANAP relocation request may be communicated through service provider network 50 to small cell GW 26.

At 336, small cell GW 26 may query macro radio database 19 using the target cell ID to recover the geolocation of macro radio 32 from source macro radio database 19 and to recover the target sub-carrier ID. For example, the query may be performed using the one or more first enhanced functions discussed above, which may be contained in handover management module 17. In one or more embodiments, the target sub-carrier may be recovered from the target cell ID, if a full target sub-carrier ID is encoded in the target cell ID, or may be recovered from some related mapping within macro radio database 19, if a compressed target cell ID may be encoded in the target cell ID. At 338, a response to the query may be returned including the geolocation for source macro radio 32 and the target sub-carrier ID.

At 340, small cell GW 26 may query, via a target request message, small cell MS 28 using the recovered source macro radio geolocation and the target sub-carrier ID. For example, the query may be performed using the one or more first enhanced functions via handover management module 17. At 342, small cell MS 28 may determine, via small cell database 18, potential target small cell APs within a specified 'range' of the source macro radio geolocation and having a sub-carrier ID matching the target sub-carrier ID. Thus, small cell MS may perform two-level filtering to determine potential target small cell APs to receive hand-in of UE 12. For the present example, this determination may yield potential target small cell APs 20, 22 as being within the specified range and having matching sub-carrier IDs. Note, in certain embodiments, a search range may optionally be included in the target request message of flow 340. At 344, small cell MS 28 may communicate a target response message to small cell GW 26 including IDs for identified potential target small cell APs meeting the criteria included in the target request message from flow 340.

Using the returned small cell AP IDs, small cell GW 346 may determine at 346 a common unused landing channel for the identified potential target small cell APs 20, 22, which can receive hand-in of UE 12. Upon determining a common unused landing channel for each small cell AP 20, 22, small cell GW 26 may communicate respective RUA relocation request messages to small cell APs 20, 22 at 348 and 350, respectively. Each RUA relocation request message may include landing channel info (e.g., channel number, etc.) in addition to physical channel reconfiguration information for the identified landing channel in order to prepare the common landing channel for each small cell AP 20, 22. At 352, relocation procedure may continue for the system to complete relocation of UE 12 to one of small cell APs 20, 22. Various relocation procedures are discussed in further detail below.

Figure 4A:
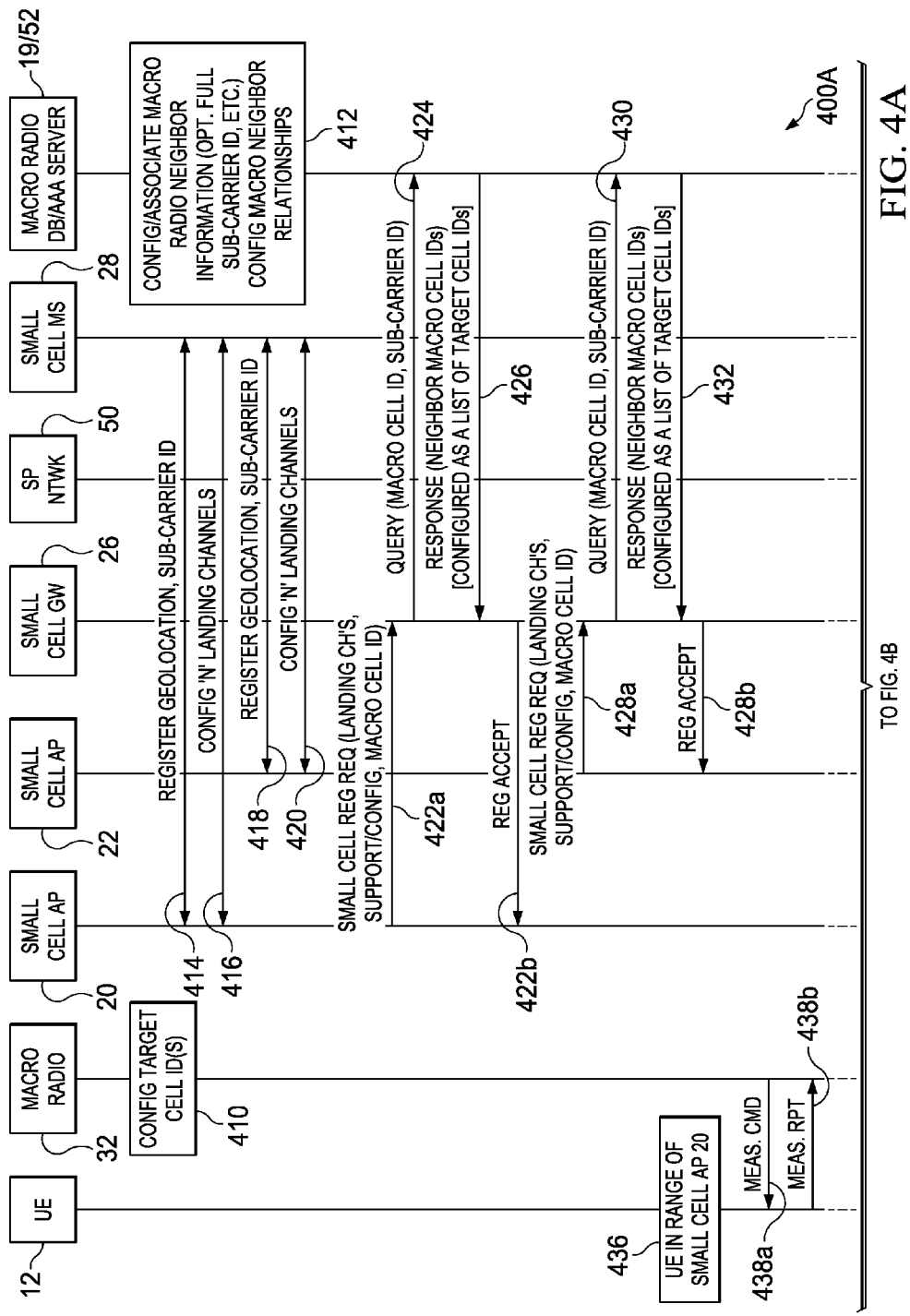

Referring to FIGS. 4A-4B, FIGS. 4A-4B simplified flow diagrams 400A-400B, respectively, that illustrates other example flows and activities associated with providing handover to an ambiguous small cell AP (e.g., one of small cell APs 20, 22) in a network environment according to an embodiment. Particularly, the flows and activities illustrated in FIGS. 4A-4B may be associated with using macro neighbor information to determine potential target small cell APs to receive hand-in of UE 12. For FIGS. 4A-4B, macro radio database 19 may optionally be included in AAA server 52 and/or AAA server may be in communication with macro database 19 in order to populate macro neighbor relationship information for the database.

In the example flow diagram 400A shown in FIG. 4A, at 410, macro radio 32 may be configured with one or more target cell IDs, each which may be encoded with a macro cell ID corresponding to the identity of macro radio 32 and a target sub-carrier ID corresponding to one or more target sub-carrier IDs for small cell APs 20, 22. For purposes of the present example, it is assumed that small cell APs 20, 22 may be configured with a same sub-carrier ID; thus, macro radio 32 may only need to configure one target cell ID for use within communication system 10.

At 412, macro radio database 19 may be configured with one or more target cell IDs, which may be associated with other neighbor macro radios of macro radio 32. Optionally, macro radio database 19 may be configured with macro radio information, e.g., macro radio identifiers, geolocation information etc., which may be associated neighbor macro radios of macro radio 32. Neighbor relationships may be configured within macro radio database 19; the relationships can be used to cross-reference source macro radios with macro radio neighbors corresponding thereto. Optionally, macro radio database 19 may be configured with one or more look-up tables, if, for instance, a sub-carrier ID encoded in the target cell IDs may not represent a full target sub-carrier ID such that a look-up could be performed to determine a full target sub-carrier ID upon receiving a compressed sub-carrier ID. Other look-ups could be configured depending on other information (full or compressed), which may be encoded in target cell IDs. In one or more embodiments, source/controlling RNC information could be stored in macro database for use with 3G macro radios. In one or more embodiments, source/controlling RNC information could also be stored in small cell GW 26. In one or more embodiments, geolocation information for macro radio 32 and/or neighboring macro radios may also be stored in macro radio database 19.

Flows 414, 416, 418 and 420 may generally be the same as flows 314, 316, 318 and 320 of FIG. 3A for registering and/or configuring geolocation information, sub-carrier ID information and landing channel information for small cell APs 20, 22. Continuing at 422a, small cell AP 20 may communicate a small cell register request message to small cell GW 26. The register request may include information regarding the 'N' landing channels configured for small cell AP 20, support and/or configuration information for small cell AP 20, and, additionally, a macro cell ID corresponding to a dominant macro radio (e.g., macro radio 32, for the present example) whose coverage area small cell AP 20 may be under. At 424, small cell GW 26 may query macro radio database 19 using the received macro cell ID and the sub-carrier ID for small cell AP 20. At 426, a response from macro radio database 19 may include a list of neighboring macro cell IDs for macro radio 32. The list may be configured as a list of one or more target cell ID IEs, each encoded with a macro cell ID for a corresponding macro radio neighbor and the sub-carrier ID for small cell AP 20. Upon recovering the macro radio neighbors, a register accept message may be communicated from small cell GW 26 to small cell AP 20 at 422b. A similar exchange may occur between small cell AP 22, small cell GW 26 and macro radio database 19 to determine a list of target cell IDs for macro neighbors of small cell AP 22 through flows 428a, 430, 432 and 428b.

The flows and activities from FIG. 4A may continue to flows and activities as shown in flow diagram 400B for FIG. 4B. At 434, small cell GW 26 may store, for each small cell AP 20, 22, a mapping in small cell database 18 that indicates which target cell IDs may be used to initiate a macro-to-femto handover for each small cell AP 20, 22. For purposes of the present example, small cell database 18 may be assumed to be configured/located within small cell GW 26.

At 436, it is assumed for the present example that UE 12 is in range of a coverage area provided by small cell AP 20. At 438a, macro radio 32 may communicate a measurement command to a given UE 12 for a given pseudo sub-carrier ID, for example, a pseudo sub-carrier ID associated with the sub-carrier IDs for small cell APs 20, 22. At 438b, UE 12 may communicate a measurement report to macro radio 32 for the pseudo sub-carrier ID. Macro radio 32 may include standard logic to trigger a serving radio network subsystem (SRNS) relocation for UE 12 based on the measurement report. At 440, source macro radio 32 may communicate a RANAP relocation required message to service provider network 50 including the target cell ID previously encoded with the macro cell ID for source macro radio 32 and the target sub-carrier for small cell APs 20, 22. At 442, the RANAP relocation request may be communicated through service provider network 50 to small cell GW 26.

Using the target cell ID, small cell GW 346 may determine at 444 potential target small cell APs that may receive handover of UE 12 by matching the received target cell ID to the stored mapping of target cell IDs, which may indicate small cell APs 20, 22 as potential target small cell APs to receive handover of UE 12. Additionally at 444, small cell GW 26 may determine a common unused landing channel for the potential target small cell APs. Thus, small cell GW 26 may provide for additional levels of filtering using neighbor data to determine potential target small cell APs to receive hand-in of UE 12. Upon determining a common unused landing channel for each small cell AP 20, 22, small cell GW 26 may communicate respective RUA relocation request messages to small cell APs 20, 22 at 448 and 450, respectively. Each RUA relocation request message may include landing channel info (e.g., channel number, etc.) in addition to physical channel reconfiguration information for the identified landing channel in order to prepare the common landing channel for each small cell AP 20, 22. At 452, relocation procedure may continue for the system to complete relocation of UE 12 to one of small cell APs 20, 22. Various relocation procedures are discussed in further detail below.

Figure 5A:
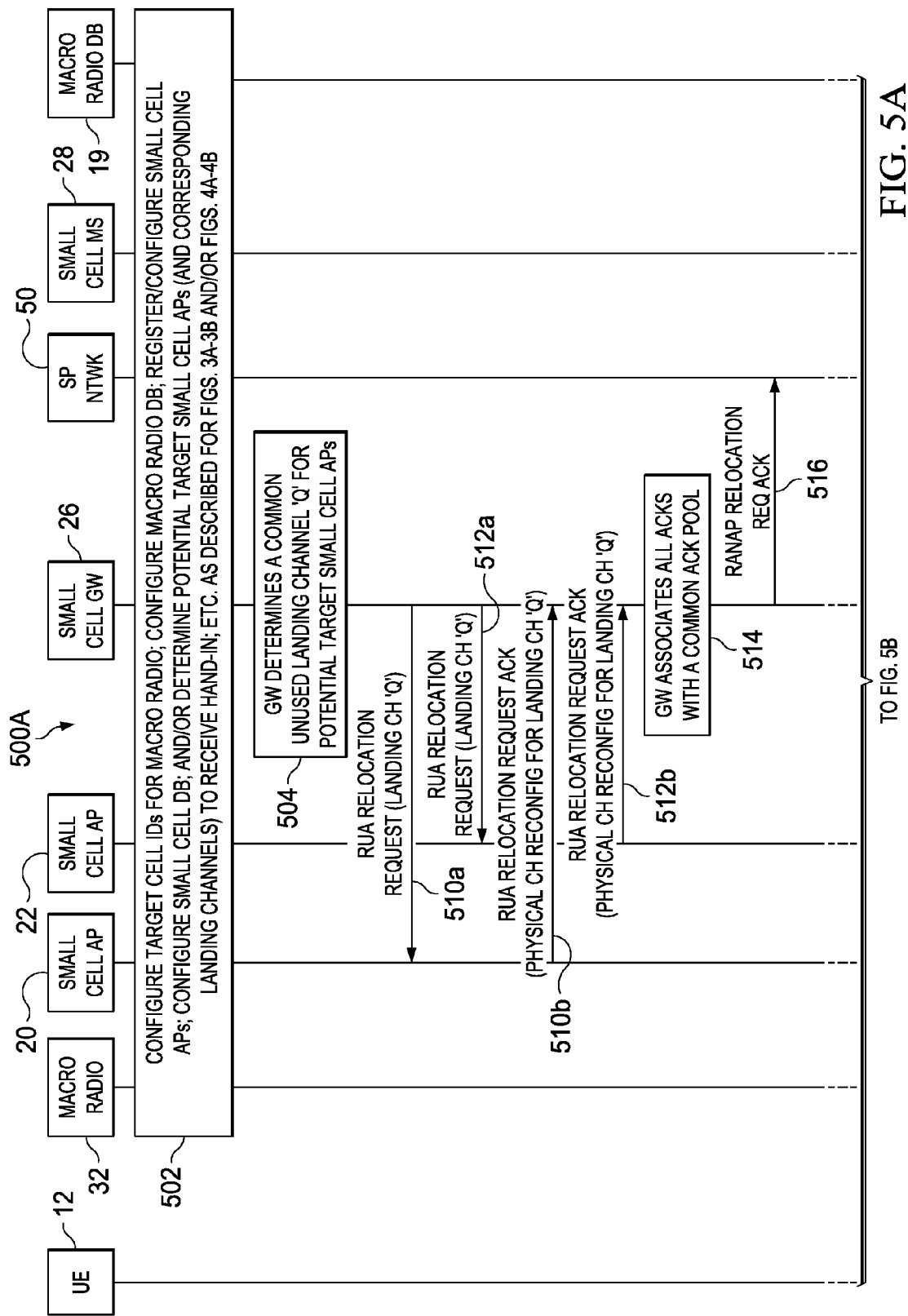

Referring to FIGS. 5A-5B, FIGS. 5A-5B are simplified flow diagrams 500A-500B, respectively, that illustrates other example flows and activities associated with providing handover to an ambiguous small cell AP (e.g., one of small cell APs 20, 22) in a network environment according to an embodiment. Particularly, the flows and activities illustrated in FIGS. 5A-5B may be associated with coordinating fan-out of relocation requests including landing channel information to potential target small cell APs 20, 22 and various other relocation flows and activities associated with completing relocation of a given UE 12 to one of small cell APs 20, 22.

For FIGS. 5A-5B, it is assumed that various configurations, associations, recoveries, determinations, etc. have already been performed as detailed in the various flows and activities discussed for FIGS. 3A-3B and/or 4A-4B. This may include, but not be limited to, configuring one or more target cell ID(s) for macro radio 32, configuring macro radio database 19, configuring small cell database 18, registering/configuring small cell APs and their corresponding landing channels to receive hand-in of UE 12, etc. at 502. The procedures and activities shown in FIGS. 5A-5B may be assumed to begin at 504 wherein small cell GW 26 may determine a common unused landing channel 'Q' for an identified or determined pool of potential target small cell APs (e.g., APs 20, 22), which can receive hand-in of UE 12. [Note 504 of FIG. 5A may, for example, correspond to activity 346 for FIG. 3B or activity 444 for FIG. 4B.]

At 510a and 512a, small cell GW 26 may communicate an RUA relocation request to each of small cell AP 20 and 22, respectively. The relocation request may identify landing channel 'Q' for receiving hand-in of UE 12 and may also include physical channel reconfiguration information for the landing channel. In an embodiment, the RUA relocation request message may include a vendor extension identifying the specified landing channel (e.g., landing channel 'Q') to receive hand-in of UE 12. At 510b and 512b, each small cell AP 20 and 22, respectively, may communicate an RUA relocation request acknowledge (ACK) message to small cell GW 26. Each RUA relocation request ACK message from each small cell AP 20, 22 may indicate the result of the physical channel reconfiguration corresponding to landing channel 'Q'. At 514, small cell GW 26 may associate all ACKs with a common ACK pool for landing channel 'Q' and, at 516, may communicate only a single RANAP relocation request ACK to service provider network 50, indicating successful physical channel reconfiguration.

The flows and activities from FIG. 5A may continue to flows and activities as shown in flow diagram 500B for FIG. 5B. At 518, service provider network 50 may communicate a RANAP relocation command message to source macro radio 32. Encapsulated in the relocation command may be an RRC container IE, which may include a physical channel reconfiguration message received from one of small cell APs 20, 22 (e.g., indicating successful reconfiguration). At 520, source macro radio 32 may communicate an RRC physical channel reconfiguration message to UE 12 including matching physical channel configuration information as prepared for landing channel 'Q' for each of small cell APs 20, 22.

UE 12 may attempt to relocate to one of small cell APs 20, 22. One of small cell APs may detect an uplink (UL) sync UE 12 following its physical channel reconfiguration. In the present example, small cell AP 20 may detect the UL sync of UE 12, however, it should be understood that in a given communication system any potential target small cell APs having a common landing channel prepared to receive hand-in of a given UE may receive hand-in of the UE. At 522, for example, small cell AP 20 may communicate a RANAP relocation detect message to small cell GW 26. As shown at 524, no UL sync may be detected by small cell AP 22. At 526, small cell GW 26 may coordinate the release of landing channel 'Q' for potential target small cell APs (e.g., small cell AP 22) that have not reported a relocation detection. In an embodiment, the coordinated release may include the expiry of a timer or other similar mechanism within small cell GW 26, following which an Iu release message may be communicated as shown at 528 to the potential target small cell APs for which a relocation detect has not been received (e.g., small cell AP 22).

Continuing at 530, UE 12 may communicate an RRC physical channel reconfiguration complete message to macro radio 32. Upon receipt of the message, macro radio 32 may communicate an RUE relocation complete message to small cell GW 26 at 532. At 534, small cell GW 26 may determine whether to free landing channel 'Q' from its internally maintained landing channel list as being available for subsequent relocation procedures or whether to mark landing channel 'Q' as 'in-use' for its internally maintained landing channel list. The determination may depend on the type of landing channels used in the system. In one embodiment, landing channels may be configured and maintained for all small cell APs within the system as a static set of landing channels reserved for each small cell AP. In such an embodiment, a small cell AP may move a relocated UE from a landing channel to another channel for the small cell AP after completing the handover. Thus, a landing channel may be marked as free for subsequent relocations following acknowledgement from a small cell AP that relocation has completed for the UE.

In another embodiment, landing channels may be configured and maintained for all small cell APs as a dynamic set of landing channels, wherein each small cell AP may have different sets of landing channels. In such an embodiment, a landing channel receiving relocation of a given UE for a small cell AP may also be the permanent channel configured to serve the UE following relocation. Thus, a landing channel may be marked as 'in-use' for the small cell AP (and within the landing channel list maintained by small cell GW 26) such that the landing channel may not be reallocated for use in a subsequent relocation until the small cell AP is no longer serving the UE.

At 536, small cell GW may communicate a RANAP relocation complete message to service provider network 50. At 538, a RANAP Iu release command including a cause indicating successful relocation of UE 12 may be communicated from service provider network 50 to macro radio 32. At 540, a RANAP Iu release complete response may be communicated from macro radio 32 to service provider network 50 and relocation of UE 12 to small cell AP 20 may be completed.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for a communication network comprising:
configuring a plurality of common channels for each of a plurality of small cell access points to form a pool of common channels for use in relocation operations;
receiving a request to relocate a first user equipment (UE) from a source macro radio to an ambiguous small cell access point, wherein the request includes, at least in part, a first target cell identity (ID) encoded with a source macro cell identifier for the source macro radio and a target sub-carrier identifier for the ambiguous small cell access point, wherein the first target cell ID is 24-bits in length in which one of the target sub-carrier identifier is 4-bits in length or the source macro cell identifier is 16-bits or 20 bits in length;
determining a plurality of potential target small cell access points from the plurality of small cell access points for which the plurality of common channels are configured for relocation of the first UE using the using the first target cell ID, wherein determining the plurality of potential target small cell access points further comprises:
recovering a geolocation for the source macro radio using a source macro cell identifier associated with the source macro radio; and
filtering, from the plurality of small cell access points for which the plurality of common channels are configured, the plurality of potential target small cell access points that are located within a predetermined distance from the geolocation of the source macro radio and that operate using the target sub-carrier identifier, wherein the predetermined distance identifies a perimeter around the source macro radio that is less than a coverage area of the source macro radio; and
preparing, for each of the plurality of potential target small cell access points, a particular common channel to receive relocation of the first UE, wherein the first UE attempts to relocate to a particular target small cell access point using the particular common channel prepared for each of the plurality of potential target small cell access points.

2. The method of claim 1, further comprising:
storing, in at least one memory element, a geolocation of each of a plurality of macro radios, wherein the geolocation of each macro radio is stored in relation to a corresponding macro cell identifier for each macro radio; and
storing a geolocation and a sub-carrier identifier for each of the plurality of small cell access points for which the plurality of common channels are configured.

3. The method of claim 1, further comprising:
determining a macro neighbor list for each of the plurality of small cell access points for which the plurality of common channels are configured, wherein each macro neighbor list for each of a particular small cell access point comprises:
one or more macro cell identifiers indicating one or more macro radios that provide a coverage area that overlaps, at least in part, a coverage area for the particular small cell access point; and
a corresponding sub-carrier identifier used by the particular small cell access point; and
encoding, in at least one memory element, one or more second target cell IDs for each macro neighbor list, wherein each second target cell ID information element for each of a particular neighbor list is encoded, at least in part, with a macro cell identifier for a corresponding macro radio identified in a macro neighbor list for the particular small cell access point a corresponding sub-carrier identifier for the particular small cell access point.

4. The method of claim 3, wherein the determining the plurality of potential target small cell access points further comprises:
receiving, by a small cell gateway, the first target cell ID; and
querying the one or more second target cell IDs using the first target cell ID to filter, from the plurality of small cell access points for which the plurality of common channels are configured, the potential target small cell access points within the coverage area for the source macro radio that operate using the target sub-carrier identifier.

5. The method of claim 1, further comprising:
determining close range macro radios for each of the plurality of small cell access points for which the plurality of common channels are configured by recovering reports of Radio Environment Measurements (REMs) performed by each of the plurality of small cell access points, wherein each REM report for each of a particular small cell access point includes one or more macro cell identifiers indicating one or more corresponding macro radios that provide a coverage area that overlaps, at least in part, a coverage area for the particular small cell access point and a corresponding sub-carrier identifier used by the particular small cell access point.

6. The method of claim 1, further comprising:
releasing the particular common channel prepared for each of the plurality of potential target small cell access points to which the UE did not relocate.

7. The method of claim 1, further comprising:
maintaining a record of used and unused common channels for each of the plurality of small cell access points for which the plurality of common channels are configured, wherein the record is used to determine an unused common channel to prepare for each of the potential target small cell access points to receive hand-in of the first UE.

8. The method of claim 1, wherein the target sub-carrier identifier is one of:
a primary scrambling code; and
a physical cell identifier.

9. One or more non-transitory tangible media encoding logic that include instructions for execution by a processor, wherein the execution causes the processor to perform operations, comprising:
configuring a plurality of common channels for each of a plurality of small cell access points to form a pool of common channels for use in relocation operations;
receiving a request to relocate a first user equipment (UE) from a source macro radio to an ambiguous small cell access point, wherein the request includes, at least in part, a first target cell identity (ID) encoded with a source macro cell identifier for the source macro radio and a target sub-carrier identifier for the ambiguous small cell access point wherein the first target cell ID is 24-bits in length in which one of the target sub-carrier identifier is 4-bits in length or the source macro cell identifier is 16-bits or 20 bits in length;
determining a plurality of potential target small cell access points from the plurality of small cell access points for which the plurality of common channels are configured for relocation of the first UE using the using the first target cell ID, wherein determining the plurality of potential target small cell access points further comprises:
recovering a geolocation for the source macro radio using the source macro cell identifier associated with the source macro radio; and
filtering, from the plurality of small cell access points for which the plurality of common channels are configured, the plurality of potential target small cell access points that are located within a predetermined distance from the geolocation of the source macro radio and that operate using the target sub-carrier identifier, wherein the predetermined distance identifies a perimeter around the source macro radio that is less than a coverage area of the source macro radio; and
preparing, for each of the plurality of potential target small cell access points, a particular common channel to receive relocation of the first UE, wherein the first UE attempts to relocate to a particular target small cell access point using the particular common channel prepared for each of the plurality of potential target small cell access points.

10. The media of claim 9, wherein the execution causes the processor to perform further operations, comprising:
storing, in at least one memory element, a geolocation of each of a plurality of macro radios, wherein the geolocation of each macro radio is stored in relation to a corresponding macro cell identifier for each macro radio; and
storing a geolocation and a sub-carrier identifier for each of the plurality of small cell access points for which the plurality of common channels are configured.

11. The media of claim 9, wherein the execution causes the processor to perform further operations, comprising:
determining a macro neighbor list for each of the plurality of small cell access points for which the plurality of common channels are configured, wherein each macro neighbor list for each of a particular small cell access point comprises:
one or more macro cell identifiers indicating one or more macro radios that provide a coverage area that overlaps, at least in part, a coverage area for the particular small cell access point; and
a corresponding sub-carrier identifier used by the particular small cell access point; and
encoding, in at least one memory element, one or more second target cell IDs for each macro neighbor list, wherein each second target cell ID information element for each of a particular neighbor list is encoded, at least in part, with a macro cell identifier for a corresponding macro radio identified in a macro neighbor list for the particular small cell access point a corresponding sub-carrier identifier for the particular small cell access point.

12. The media of claim 11, wherein the determining the plurality of potential target small cell access points further comprises:
receiving, by a small cell gateway, the first target cell ID; and
querying the one or more second target cell IDs using the first target cell ID to filter, from the plurality of small cell access points for which the plurality of common channels are configured, the potential target small cell access points within the coverage area for the source macro radio that operate using the target sub-carrier identifier.

13. The media of claim 9, wherein the execution causes the processor to perform further operations, comprising:
determining close range macro radios for each of the plurality of small cell access points for which the plurality of common channels are configured by recovering reports of Radio Environment Measurements (REMs) performed by each of the plurality of small cell access points, wherein each REM report for each of a particular small cell access point includes one or more macro cell identifiers indicating one or more corresponding macro radios that provide a coverage area that overlaps, at least in part, a coverage area for the particular small cell access point and a corresponding sub-carrier identifier used by the particular small cell access point.

14. The media of claim 9, wherein the execution causes the processor to perform further operations, comprising:
　releasing the particular common channel prepared for each of the plurality of potential target small cell access points to which the UE did not relocate.

15. The media of claim 9, wherein the execution causes the processor to perform further operations, comprising:
　maintaining a record of used and unused common channels for each of the plurality of small cell access points for which the plurality of common channels are configured, wherein the record is used to determine an unused common channel to prepare for each of the potential target small cell access points to receive relocation of the first UE.

16. A system, comprising:
　a small cell gateway;
　a memory element for storing data; and
　a processor for executing instructions associated with the data, wherein the executing causes the system to perform operations, comprising:
　　configuring a plurality of common channels for each of a plurality of small cell access points to form a pool of common channels for use in relocation operations;
　　receiving a request to relocate a first user equipment (UE) from a source macro radio to an ambiguous small cell access point, wherein the request includes, at least in part, a first target cell identity (ID) encoded, at least in part, with a source macro cell identifier for the source macro radio and a target sub-carrier identifier for the ambiguous small cell access point, wherein the first target cell ID is 24-bits in length in which one of the target sub-carrier identifier is 4-bits in length or the source macro cell identifier is 16-bits or 20 bits in length;
　　determining a plurality of potential target small cell access points from the plurality of small cell access points for which the plurality of common channels are configured for relocation of the first UE using the using the first target cell ID, wherein determining the plurality of potential target small cell access points further comprises:
　　　recovering a geolocation for the source macro radio using a source macro cell identifier associated with the source macro radio; and
　　　filtering, from the plurality of small cell access points for which the plurality of common channels are configured, the plurality of potential target small cell access points that are located within a predetermined distance from the geolocation of the source macro radio and that operate using the target sub-carrier identifier, wherein the predetermined distance identifies a perimeter around the source macro radio that is less than a coverage area of the source macro radio; and
　　preparing, for each of the plurality of potential target small cell access points, a particular common channel to receive relocation of the first UE, wherein the first UE attempts to relocate to a particular target small cell access point using the particular common channel prepared for each of the plurality of potential target small cell access points.

17. The system of claim 16, wherein the executing causes the system to perform operations, comprising:
　storing, in at least one memory element, a geolocation of each of a plurality of macro radios in a communication network, wherein the geolocation of each macro radio is stored in relation to a corresponding macro cell identifier for each macro radio; and
　storing a geolocation and a sub-carrier identifier for each of the plurality of small cell access points for which the plurality of common channels are configured.

18. The system of claim 16, wherein the executing causes the system to perform further operations, comprising:
　determining a macro neighbor list for each of the plurality of small cell access points for which the plurality of common channels are configured, wherein each macro neighbor list for each of a particular small cell access point comprises:
　　one or more macro cell identifiers indicating one or more macro radios that provide a coverage area that overlaps, at least in part, a coverage area for the particular small cell access point; and
　　a corresponding sub-carrier identifier used by the particular small cell access point; and
　encoding, in at least one memory element, one or more second target cell IDs for each macro neighbor list, wherein each second target cell ID information element for each of a particular neighbor list is encoded, at least in part, with a macro cell identifier for a corresponding macro radio identified in a macro neighbor list for the particular small cell access point a corresponding sub-carrier identifier for the particular small cell access point.

19. The system of claim 16, wherein the executing causes the system to perform further operations, comprising:
　determining close range macro radios for each of the plurality of small cell access points for which the plurality of common channels are configured by recovering reports of Radio Environment Measurements (REMs) performed by each of the plurality of small cell access points, wherein each REM report for each of a particular small cell access point includes one or more macro cell identifiers indicating one or more corresponding macro radios that provide a coverage area that overlaps, at least in part, a coverage area for the particular small cell access point and a corresponding sub-carrier identifier used by the particular small cell access point.

20. The system of claim 16, wherein the executing causes the system to perform operations, comprising:
　releasing the particular common channel prepared for each of the plurality of potential target small cell access points to which the UE did not relocate.

\* \* \* \* \*